United States Patent [19]

Bier

[11] 4,404,161

[45] Sep. 13, 1983

[54] PROCESS FOR INJECTION MOLDING A RAPIDLY CRYSTALLIZING POLYETHYLENE TEREPHTHALATE COMPOSITION AT REDUCED MOLD TEMPERATURES

[75] Inventor: Peter Bier, New Martinsville, W. Va.

[73] Assignee: Bayer Aktiengesellschaft, Leverkusen, Fed. Rep. of Germany

[21] Appl. No.: 254,351

[22] Filed: Apr. 15, 1981

Related U.S. Application Data

[63] Continuation of Ser. No. 95,274, Nov. 19, 1979, abandoned.

[51] Int. Cl.³ .............................................. B29F 1/08
[52] U.S. Cl. ............................... 264/328.16; 260/40 R; 264/328.18; 525/64
[58] Field of Search ....................... 264/328.16, 328.18; 260/40 R; 525/64

[56] References Cited

U.S. PATENT DOCUMENTS

| | | | |
|---|---|---|---|
| 3,368,995 | 2/1968 | Furukawa | 260/40 |
| 3,516,957 | 6/1970 | Gray | 260/22 |
| 3,671,487 | 6/1972 | Abolins | 260/40 R |
| 3,692,744 | 9/1972 | Rich | 260/75 T |
| 3,808,180 | 4/1974 | Owens | 525/293 |
| 3,814,725 | 6/1974 | Zummerman | 260/40 R |
| 4,022,748 | 5/1977 | Schlichting | 260/40 R |
| 4,034,013 | 7/1977 | Lone | 260/835 |
| 4,086,296 | 4/1978 | Carty | 260/875 G |
| 4,096,202 | 6/1978 | Farnham | 260/40 R |
| 4,212,791 | 7/1980 | Avery | 260/40 R |
| 4,352,904 | 10/1982 | Deyrup | 524/292 |

FOREIGN PATENT DOCUMENTS 1111012 4/1968 United Kingdom .................. 525/64

OTHER PUBLICATIONS

Die Angewandte Makromolekulare Chemie, 65 (1977), pp. 1–21 (translation).

Primary Examiner—Thomas P. Pavelko
Attorney, Agent, or Firm—Gene Harsh; Lawrence S. Pope

[57] ABSTRACT

This disclosure is concerned with a process for molding polyethylene terephthalate at a reduced mold temperature, i.e., less than 120° C., and still obtaining crystalline parts by incorporating a small amount of a two phase polyacrylate comprised of a cross-linked elastomeric first phase to which a rigid thermoplastic second phase has been grafted. It is also concerned with a glass reinforced polyethylene terephthalate especially suitable for molding into colder molds which contain this two phase polyacrylate.

6 Claims, No Drawings

PROCESS FOR INJECTION MOLDING A RAPIDLY CRYSTALLIZING POLYETHYLENE TEREPHTHALATE COMPOSITION AT REDUCED MOLD TEMPERATURES

This application is a continuation of application Ser. No. 95,274, filed Nov. 19, 1979, now abandoned.

BACKGROUND OF THE INVENTION

Polyalkylene terephthalates have acquired considerable significance as starting materials for the production of fibers, films and shaped articles. By virtue of their partially crystalline structure, they show outstanding properties, for example, high wear resistance, favorable creep rupture strength and high dimensional stability, and are therefore particularly suitable for the production of shaped articles subjected to heavy mechanical and thermal stressing. An additional improvement in their mechanical properties can be obtained by the incorporation of reinforcing materials, for example glass fibers (U.K. patent specification No. 1,111,012, U.S. Pat. No. 3,368,955, German Auslegeschrift No. 2,042,447).

By virtue of its special physical properties, polyethylene terephthalate (PET) is particularly suitable for the production of fiber products and films, but is scarcely suitable for injection-molding because high mold temperatures (about 140° C.) and relatively long molding times are required for this purpose. This serious disadvantage almost completely prevents the use of polyethylene terephthalate for injection-molding despite its high rigidity and thermal stability.

Although polypropylene terephthalate (PPT) and polybutylene terephthalate (PBT) require shorter molding times and lower mold temperatures (about 100° C.) by virtue of their higher crystallization rate, they show poorer physical properties, in particular less thermal stability than polyethylene terephthalate.

It has also been tried to produce polycondensates which combine the favorable properties both of polyethylene terephthalate and of polypropylene or polybutylene terephthalate. For example, it is known that the tendency towards crystallization of polyethylene terephthalate can be improved by nucleation with finely divided, solid inorganic materials (Netherlands patent specification No. 6,511,744).

High crystallinity guarantees hardness and dimensional stability, even at elevated temperatures. This high crystallinity should be reached as quickly as possible in order to ensure that optimum properties are obtained. In addition, the residence time in the mold determines the injection cycle, the length of which is one of the determining factors of the economy of the process. Even at high mold temperatures, these cycles are too long and, for this reason, are an obstacle to the acceptance of polyethylene terephthalate for use in the production of shaped articles by injection molding.

SUMMARY OF THE INVENTION

The present invention relates to a novel process for injection molding thermoplastic compositions which are based on polyethylene terephthalates which can be molded at temperatures of less than about 120° C. and still produce parts of high crystallinity.

The process of the present invention broadly comprises
(a) intimately blending
  (i) from 70 to 98%, preferably from 85 to 95% by weight, of a polyethylene terephthalate having an intrinsic viscosity of at least about 0.3 dl/g, preferably at least about 0.5 dl/g, measured as a 0.5% by weight solution in a 1:1 mixture of phenol and tetrachloroethane at 25° C., and
  (ii) from 2 to 30%, and preferably from 5 to 20%, by weight of a multi-phase composite interpolymer comprising:
    (A) about 25 to 95 weight percent of a first elastomeric phase polymerized from a monomer system comprising about 75 to 99.8% by weight $C_1$ to $C_6$ alkyl acrylate, 0.1 to 5% by weight crosslinking monomer, 0.1 to 5% by weight graftlinking monomer, said crosslinking member being a polyethylenically unsaturated monomer having a plurality of addition polymerizable reactive groups, all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and
    (B) about 75 to 5 weight percent of a final, rigid thermoplastic phase which is polymerized in the presence of said elastomeric phase and which is free of epoxy groups; and
(b) injection molding the resultant blend into a mold held at a temperature of no more than 120° C., and no less than 70° C., preferably at a temperature between 80° and 100° C.

DETAILED DESCRIPTION OF THE INVENTION

The invention is directed broadly to a process for injection molding an at least two-component composition, i.e., a polyalkylene terephthalate, and an interpolymer.

The dicarboxylic acid component of the polyethylene terephthalate (a) consists mainly of terephthalic acid and may contain up to 10 mol %, based on the total mols of acid of other aromatic dicarboxylic acids having from 6 to 14 carbon atoms, of aliphatic dicarboxylic acids having from 4 to 8 carbon atoms or of cycloaliphatic dicarboxylic acids having from 8 to 12 carbon atoms. Examples of such dicarboxylic acids which may be included with terephthalic acid are phthalic acid, isophthalic acid, naphthalane-2,6-dicarboxylic acid, diphenyl-4,4'-dicarboxylic acid, adipic acid, sebacic acid and cyclohexanediacetic acid.

The diol component of the polyethylene terephthalate consists mainly of ethylene glycol. It may, however, contain up to 10 mol % of aliphatic diols having from 3 to 12 carbon atoms, cycloaliphatic diols having from 6 to 15 carbon atoms or aromatic diols having from 6 to 21 carbon atoms. Examples of such additional diols ("codiols") include propane-1,3-diol, butane-1,4-diol, pentane-1,5-diol, hexane-1,6-diol or cyclohexane-1,4-dimethanol, 3-methyl-pentanediol-(2,4), 2-methylpentanediol-(1,4), 2,2,4-trimethylpentanediol-(1,3), 2-ethylhexanediol-(1,3), 2,2-diethylpropanediol-(1,3), hexanediol-(1,3), 1,4-di-($\beta$-hydroxyethoxy)-benzene, 2,2-bis-(4-hydroxycyclohexyl)-propane, 2,4-dihydroxy-1,1,3,3-tetramethyl-cyclobutane, 2,2-bis-(3-$\beta$-hydroxyethoxyphenyl)-propane and 2,2-bis-(4-hydroxypropoxyphenyl)-propane.

The polyethylene terephthalates can be branched by incorporating relatively small amounts of trihydric or tetrahydric alcohols or tribasic or tetrabasic acids, as described in German Offenlegungsschrift No. 1,900,270 and in U.S. Pat. No. 3,692,744. Examples of suitable branching agents include trimesic acid, pyromellitic acid, trimethylolpropane and ethane, and pentaerythritol. It is advisable not to use more than 1 mol % of branching agent, based on the quantity of acid component.

Polyethylene terephthalates derived mainly from terephthalic acid and ethylene glycol are preferred and homoethylene terephthalate, i.e. a product produced substantially only from ethylene glycol and terephthalate acid or its esters, or its anhydride is most preferred.

The polyethylene terephthalate can be prepared in known manner by (a) esterification or transesterification of terephthalic acid and/or of the corresponding dialkylterephthalates, preferably the dimethyl ester, with from 1.05 to 5.0 mol, preferably from 1.4 to 3.6 mol of the diol, based on 1 mol of the dicarboxylic acid component, and optionally the branching agent, in the presence of esterification and/or transesterification catalysts (first stage), and (b) polycondensation of the resulting reaction products in the presence of polycondensation catalysts at temperatures between 200° and 320° C. at reduced pressure (preferably below 1 Torr) (second stage).

Both the first step (a) and the second step (b) of condensation are usually carried out in the presence of catalysts, e.g. those described by R. E. Wilfong in J. Polym. Sci., 54, 385 (1961). Some of these catalysts (A) are more powerful accelerators of the esterification reaction (a), others (B) for the polycondensation reaction (b), and still others (C) are fairly active for both (a) and (b).

The following are examples of catalysts (A) which are suitable for accelerating reaction (a):

1. Lithium, sodium, potassium, calcium, strontium and boron in the form of the metals or their oxides, hydrides, formates, acetates, alcoholates, or glycolates;
2. Calcium and strontium chlorides and bromides;
3. Tertiary amines;
4. Calcium and strontium malonates, adipates, benzoates, etc.;
5. Lithium salts of dithiocarbamic acids.

The following are examples of catalysts (B) suitable for the polycondensation reaction (b):

1. Molybdenum, germanium, lead, tin and antimony in the form of the metals or their oxides, hydrides, formates, alcoholates or glycolates;
2. Zinc and lead perborates and borates;
3. Zinc, manganese(II), cobalt, magnesium, chromium, iron and cadmium succinates, butyrates, adipates or enolates of a diketone;
4. Zinc chloride and bromide;
5. Lanthanum dioxide and titanate;
6. Neodymium chloride;
7. Mixed salts of antimony, e.g. potassium antimony tartrate, and salts of antimonic acids, such as potassium pyroantimonate;
8. Zinc or manganese salts of dithiocarbamic acids;
9. Cobalt naphthenate;
10. Titanium tetrafluoride or tetrachloride;
11. Alkyl ortho-titanates;
12. Titanium tetrachloride ether complexes;
13. Quaternary ammonium salts carrying a titanium hexaalkoxy group; titanium tetraalkoxides, alkali metal or alkaline earth metal compounds of aluminum, zirconium or titanium alkoxides;
14. Organic quaternary ammonium, sulphonium, phosphonium and oxonium hydroxides and salts;
15. Barium malonate, adipate, benzoate, etc.;
16. Lead, zinc, cadmium or manganese salts of the monoalkyl ester of a phenylene dicarboxylic acid;
17. Antimony catechuic complexes with an amino alcohol or with an amine and an alcohol;
18. Uranium trioxide, tetrahalide, nitrate, sulphate or acetate.

The following are examples of catalysts (C) which are suitable for accelerating both steps (a) and (b) of the reaction:

1. Barium, magnesium, zinc, cadmium, aluminum, manganese and cobalt as the metals or their oxides, hydrides, formates, alcoholates, glycolates or preferably, as acetates;
2. Aluminum chloride and bromide;
3. Zinc, manganese(II), cobalt, magnesium, chromium, iron and cadmium succinates, butyrates, adipates, or enolates of a diketone.

The most suitable compounds for use as catalysts (A) are calcium, zinc and manganese salts, particularly the acetates.

The most suitable catalysts (B) are the compounds of zinc, manganese, cobalt, antimony, germanium, titanium and tin, e.g. zinc and manganese acetate, antimony trioxide, trichloride and triacetate, and germanium dioxide and tetrachloride.

The most suitable catalysts (C) are particularly the titanium compounds, e.g. tetraalkyltitanium acid esters having alkyl groups with from 1 to 10 carbon atoms, such as tetraisopropyltitanate and tetrabutyltitanate.

The catalysts are used in quantities of from 0.001 to 0.2% by weight, based on the dicarboxylic acid components.

Inhibitors may be added in the process to inhibit the catalysts (A) after completion of the first reaction step (a) and to increase the stability of the end product (cf. "Polyesterfasern" by H. Ludewig, 2nd Edition, publishers Akademie-Verlag, Berlin 1974). The following are examples of such inhibitors: phosphoric acid, phosphorous acid and aliphatic, aromatic and araliphatic esters thereof, e.g. the alkyl esters having from 6 to 18 carbon atoms in the alcohol component, phenyl esters in which the phenyl groups can carry 1 to 3 substituents having 6 to 18 carbon atoms, such as trinonylphenyl phosphate, dodecyl phenyl phosphate or triphenyl phosphate. These inhibitors are usually added in quantities of from 0.01 to 0.6% by weight, based on the dicarboxylic acid component.

In order to obtain an even higher molecular weight, the polyethylene terephthalates may be subjected to a solid phase polycondensation. This is generally carried out by subjecting the granulated product to a temperature which is from 60° to 6° C. below the melting point of the polymer, either in a stream of nitrogen or under a vacuum of less than 1 Torr.

The second component of the instant invention is a multi-phase composite interpolymer comprising about 25 to 95 weight percent of a first elastomeric phase and about 75 to 5 weight percent of a final rigid thermoplastic phase. One or more intermediate phases are optional, for example a middle stage polymerized from about 75 to 100 percent by weight styrene. The first stage is polymerized from about 75 to 98.8 weight percent $C_1$ to $C_6$ acrylate resulting in an acrylic rubber core having a $T_g$ below about 10° C. and crosslinked with 0.1 to 5 weight percent crosslinking monomer and further containing 0.1 to 5 percent by weight graftlinking monomer. The preferred alkyl acrylate is butyl acrylate. The crosslinking monomer is a polyethylenically unsaturated monomer having a plurality of addition polymerizable reactive groups, all of which polymerize at substantially the same rate of reaction. Suitable crosslinking monomers include polyacrylic and polymethacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate. The graftlinking monomer is a polyethylenically unsaturated monomer having a plurality of addition polymerizable reactive groups, at least one of which polymerizing at a substantially different rate of polymerization from at least one other of said reactive groups. The function of the graftlinking monomer is to provide a residual level of unsaturation in the elastomeric phase, particularly in the latter stages of polymerization and consequently, at or near the surface of the elastomer particles. When the rigid thermoplastic phase is subsequently polymerized at the surface of the elastomer, the residual unsaturated addition polymerizable reaction group contributed by the graftlinking monomer participates in the subsequent reaction so that at least a portion of the rigid phase is chemically attached to surface of the elastomer. Among the effective graftlinking monomers are allyl group-containing monomers of allyl esters of ethylenically unsaturated acids such as allyl acrylate, allyl methacrylate, diallyl maleate, diallyl fumarate, diallyl itaconate, allyl acid maleate, allyl acid fumarate and allyl acid itaconate. Somewhat less preferred are the diallyl esters of polycarboxylic acids which do not contain polymerizable unsaturation. The preferred graftlinking monomers are allyl methacrylate and diallyl maleate. A most preferred interpolymer has only two stages, the first stage comprising about 60 to 95 percent by weight of the interpolymer and being polymerized from a monomer system comprising 95 to 99.8% by weight butyl acrylate, 0.1 to 2.5% by weight butylene diacrylate as crosslinking agent, 0.1 to 2.5% by weight allyl methacrylate or diallyl maleate as a graftlinking agent, with a final stage polymerized from about 60 to 100% by weight methyl methacrylate.

The final stage monomer system can be comprised of $C_1$ to $C_{16}$ methacrylate, styrene, acrylonitrile, alkyl acrylates, allyl methacrylate, diallyl methacrylate, and the like, as long as the over $T_g$ is at least 20° C. Preferably, the final stage monomer system is at least 50 weight percent $C_1$ to $C_4$ alkyl methacrylate. It is further preferred that the final stage polymer be free of units which tend to degrade poly(alkylene terephthalates), for example acid, hydroxyl amino and amide groups.

The presently preferred interpolymer is one produced using conventional emulsion polymerization from 79.2 parts of N-butyl acrylate, 0.4 parts of 1,3-butylene diacrylate, and 0.4 parts of diallyl maleate in a first stage, and 20 parts of methylmethacrylate in a second stage. The interpolymers useful in the instant invention are known and have been described in U.S. Pat. Nos. 3,808,180 and 4,096,202, both incorporated herein by reference. In fact, according to U.S. Pat. No. 4,096,202, the interpolymers are useful as impact modifiers for polyethylene terephthalate. What is not recognized is that these interpolymers can be used to increase the crystallization rate of PET resins and can allow for the molding of products at relatively low temperatures while obtaining high degrees of crystallinity.

A composition which is particularly suitable for molding into molds held at such reduced temperatures is one which in addition to the above specified composite interpolymer also contains between 20 and 45 wt %, based on the composition, of glass fibers.

The amounts of components present may vary over a wide range. Generally, the compositions should contain from 70 to 98%, and preferably 85 to 95%, by weight of polyethylene terephthalate and from 2 to 30%, and preferably 5 to 20%, by weight of the interpolymer.

Injection molding conditions for polyethylene terephthalates are well known to those skilled in the art and are taught in U.S. Pat. No. 3,516,957, incorporated herein by reference, and *Injection Molding Theory and Practice*, by Ervin I. Rubin, published by Wiley Interscience, 1972. Generally, these conditions involve temperatures of between about 250° and 310° C., residence times at elevated temperatures of between about 1 and 15 minutes, pressures of up to about 20,000 psi and shear rates of between about 100 and 10,000 reciprocal seconds. These conditions may also include vacuums of down to 20 inches of Hg. Of course, these conditions also include mold temperatures of between about 100° and 200° C. but as will become apparent, the composition of the present invention may be molded at lower temperatures and shorter mold times.

The mixtures of polyethylene terephthalate and interpolymer can be obtained in usual commercial mixing apparatus such as kneaders and one-shaft or two-shaft screw extruders. The solidified melt of the mixtures can be granulated for further processing, and this can be followed by a postcondensation in the solid phase.

The compositions of the present invention may be molded at temperatures of between 70° C. and about 120° C. and still yield relatively high crystallinity. When used in compositions of the present invention, these polymers may be molded under much less favorable conditions (colder molds, e.g. below about 120° C., and shorter residence time in the mold, e.g. less than about 60 seconds) and still display crystallinities similar to those obtainable under optimum conditions (i.e. high mold temperature and long residence time). Thus, the present invention includes a process for molding resins based primarily, and preferably solely, upon terephthalic acid and ethylene glycol at mold temperatures of less than about 120° C. while attaining degrees of crystallinity similar to those obtainable under optimum injection molding conditions with the polyester alone or the polyester and glass fiber alone.

The process comprises intimately blending the terephthalic acid/ethylene glycol based resin and interpolymer and injection molding the composition so prepared into molds held at temperatures less than about 120° C., preferably less than about 110° C. and greater than 80° C. The polyester consists of acid residues of which at least 90 mol % are derived from terephthalic acid and of alcohol residues of which at least 90 mol % are derived from ethylene glycol and most preferably is a homopolyethylene terephthalate. The other components of the polyester may be any of those discussed hereinabove as being suitable. The polyester should have a minimum intrinsic viscosity of about 0.3 dl/g, preferably 0.5 dl/g (measured as a 0.5% strength by weight solution in a phenol/tetrachloroethane mixture in a weight ratio of 1:1 at 25° C.).

In a preferred embodiment of this process aspect of the present invention, the residence time in the mold is significantly less than that required for the unmodified polyester (e.g. pure resin) in making the same part. For small, fairly simple parts this may be less than about 30 seconds, more preferably less than about 20 seconds and most preferably less than 10 seconds as compared to 40 seconds or more for unmodified resin. Of course, significant reductions in the mold residence time of resins modified with conventional additives such as micro talc nucleating agent are also obtained by further modifying these resins with appropriate amounts of the imide group containing compound of the present invention.

The usual quantities of stabilizers, preferably from 0.01 to 0.5% by weight, based on the weight of the polyethylene terephthalates can be added to protect against thermooxidative degradation. Suitable stabilizers include phenols and phenol derivatives, particularly sterically hindered phenols which have alkyl substituents with 1 to 6 carbon atoms in both ortho-positions to the phenolic hydroxyl group, amines, preferably secondary arylamines and their derivatives, phosphates and phosphites, preferably their aryl derivatives, quinones, copper salts of organic acids, addition compounds of copper (1) halides with phosphites, e.g. 4,4'-bis-(2,6-di-tert.-butylphenol); 1,3,5-trimethyl-2,4,6-tris-(3,5-di-tert.-butyl-4-hydroxybenzyl)-benzene; 4,4'-butylidene-bis-(6-tert.-butyl-m-cresol); 3,5-di-tert.-butyl-4-hydroxybenzyl-phosphonic acid diethyl ester; N,N'-bis-(β-naphthyl)-p-phenylenediamine; N,N'-bis-(1-methylheptyl)-p-phenylenediamine; phenyl-β-naphthylamine; 4,4'-bis-(α,α-dimethylbenzyl)-diphenylamine; 1,3,5-tris-(3,5-tert.-butyl-4-hydroxy-hydrocinnamoyl)-hexahydro-s-triazine; hydroquinone; p-benzoquinone, toluhydroquinone; p-tert.-butyl-pyrocatechol; chloranil; naphthoquinone; copper naphthenate; copper octoate; CU(I)Cl/triphenyl-phosphate; CU(I)Cl/trimethylphosphite; CU(I)Cl/tris-chloroethylphosphite; CU(I)Cl/tripropylphosphite; and p-nitrosodiumethylaniline. Also suitable as stabilizing agents against molecular weight degradation from hydrolysis are carbodiimides.

Inorganic or organic pigments, dyes, lubricants, fillers such as glass fibers, and mold release agents such as zinc stearate, montan wax, UV absorbers and the like can also be added in the usual quantities.

Flame-retardant materials can be added in amounts of from 2 to 20% by weight, based on the composition. Such known flame-retarding agents include halogen-containing compounds, elementary phosphorus or phosphorus compounds, phosphorus-nitrogen compounds, antimony trioxide or mixtures thereof. Specific materials include antimony, trioxide, decabromobiphenyl ether and tetrabromobisphenol-A-polycarbonate.

The crystallization velocity of the thermoplastic polyester molding compositions can be even further increased by adding nucleating agents in quantities of from 0.01 to 1% by weight, based on the quantity of polyester. Compounds of this kind are known in the art (cf. Kunststoff-Handbuch, Volume VIII, "Polyester", Carl Hanser Verlag, Munich, 1973, page 701).

The thermoplastic compositions of this invention are suitable for the manufacture of all kinds of molded articles by injection molding and also for the production of films and fibers.

In all of the examples which follow, the compositions were prepared for extrusion by tumbling polyethylene terephthalate pellets with all the indicated additives, all of which were in powder form, for two and one half minutes and then, when indicated, the composition was tumbled an additional twenty seconds with the chopped strand glass fibers.

These tumble blended compositions were extruded to pellets in a Waldron-Hartig 1¼" single screw extruder with a 24:1 L/D barrel, non-vented and fitted with a 2.75:1 CR screw (feed, 6 flights; meter, 12 flights at 0.115 inches) containing 4 rows of mixing pins 5.25 inches apart and each pin 0.25 inches apart. A 40, 60, 20 mesh screen assembly was used except when fiberglass or $Sb_2O_3$ were part of the composition. The temperature profile was 250° C. at the rear, middle, front and die. The melt temperature was 255°-260° C., the die pressure was 0 psi and the screw was operated at 50 rpm.

Test specimens were molded from the extruded pellets using a Newbury Industries 4 oz. capacity reciprocal screw injection machine. The thermal profile was 250° C. at the rear and front and 240° C. at the nozzle. No primary injection was used; the secondary injection time was 10 seconds and the cure time was 10 seconds for a cycle time of twenty seconds. The primary pressure was 300 psi; the secondary pressure was 0 psi and the back pressure was 50 psi. The ram speed was 70% of maximum.

The mold was held at a temperature of 100° C. and consisted of a family of cavities providing:

4" diameter × ¼" disc
4" diameter × ⅛" disc
4" diameter × 1/10" disc
4" diameter × 1/16" disc All cavities were chrome plated DME No. 3 steel and were equipped with runner shut-offs.

EXAMPLES

Examples 1–4 and Comparison Examples 1–4

The materials and amounts of materials (in parts by weight) were as indicated in Table I. The parts noted were tested for warpage. In testing for warpage, discs are molded at 250° C. melt temperature in a mold kept at 100° C. with a cycle time of 20 seconds. Upon annealing at 150° C. for 24 hours, shrinkage (if any) will cause the disc to curl. The measurement (in mm) reported is the depth of the concave curvature formed. The lower the number, the higher the degree of crystallinity. The discs are tested in sizes of ⅛"×4" (diameter) and 1/16"×4".

TABLE I

| | Unreinforced | | | | Glass Fiber Reinforced | | | |
|---|---|---|---|---|---|---|---|---|
| EXAMPLE | Example 1 | Comp. Example 1 | Example 2 | Comp. Example 2 | Example 3 | Comp. Example 3 | Example 4 | Comp. Example 4 |
| VFR 5041 | 9 | 10 | — | — | 6.3 | 7.0 | — | — |
| TENITE 7741 | — | — | 9 | 10 | — | — | 6.3 | 7.0 |
| KM330 | 1 | — | 1 | — | 0.7 | — | 0.7 | — |
| K419AA | — | — | — | — | 3.0 | 3.0 | 3.0 | 3.0 |
| ⅛" × 4" | | | | | | | | |

TABLE I-continued

|  | Unreinforced | | | | Glass Fiber Reinforced | | | |
| --- | --- | --- | --- | --- | --- | --- | --- | --- |
| EXAMPLE | Example 1 | Comp. Example 1 | Example 2 | Comp. Example 2 | Example 3 | Comp. Example 3 | Example 4 | Comp. Example 4 |
| Before Ann. | 1.40 | 4.38 | 1.25 | 3.52 | 1.52 | 3.35 | 0.70 | 2.85 |
| After Ann. | 1.40 | 4.83 | 1.25 | 3.58 | 1.22 | 3.22 | 0.80 | 1.92 |
| 1/16" × 4" | | | | | | | | |
| Before Ann. | 2.20 | — | 2.05 | — | 2.17 | 4.62 | 1.95 | 3.95 |
| After Ann. | 2.52 | — | 1.30 | — | 2.92 | 4.85 | 2.75 | 4.44 |

VFR 5041: A polyethylene terephthalate available from Goodyear, having an intrinsic viscosity of 1.04 dl/g measured as a 0.5% by weight solution in a 1:1 mixture of phenol and tetrachloroethane at 25° C.

TENITE 7741: A polyethylene terephthalate available from Eastman Kodak, having an intrinsic viscosity of 0.54 dl/g measured as a 0.5% by weight solution in a 1:1 mixture of phenol and tetrachloroethane at 25° C.

K419AA: Chopped strand glass fiber available from Owens Corning Fiberglas.

KM330: A multi-phase composite interpolymer available from Rohm and Haas based on n-butyl acrylate, 1,3-butylene diacrylate, diallyl maleate and methylmethacrylate produced according to Example 26 of U.S. Pat. No. 4,096,202.

All evaluated compositions contained a nucleating amount of microtalc and a low level (less than 0.3 wt.%) of a stabilizer system not believed to affect the crystallization behavior of the compositions.

The lower degree of warpage observed for the compositions containing the composite interpolymer is evidence that these compositions have improved or accelerated crystallization velocities. Thus, with appropriate tailoring of the part geometry and molding conditions, it is possible to obtain fully crystallized and therefore warpage-free parts at lower temperatures and with faster mold cycles than would be possible with compositions not containing this additive. The prior art has generally not recognized the possibility of molding into molds at temperatures significantly below 140° C., particularly below 120° C., and still obtaining highly crystalline parts not requiring further heat treatment.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for injection molding a thermoplastic composition comprising:
   (a) intimately blending (i) a polyethylene terephthalate having an intrinsic viscosity of at least 0.3 dl/g measured as a 0.5% by weight solution in a 1:1 mixture of phenol and tetrachloroethane at 25° C.; and (ii) a multi-phase composite interpolymer comprising:
   (A) about 25 to 95 weight percent of a first elastomeric phase polymerized from a monomer system comprising about 75 to 99.8% by weight $C_1$ to $C_6$ alkyl acrylate, 0.1 to 5% by weight cross-linking monomer, 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and
   (B) about 75 to 5 weight percent of a final, rigid thermoplastic phase which is polymerized in the presence of said elastomeric phase and which is free of epoxy groups; and
   (b) injection molding said blend into a mold held at a temperature of no more than 120° C. and no less than 80° C., said molding temperature and the amount of interpolymer being selected to yield articles with crystallinities similar to those obtainable when the same article is molded from the same composition without the interpolymer at mold temperatures of 140° C.

2. The process of claim 1 wherein the composition to be injection molded contains 20 to 45 wt % of glass fibers.

3. The process of claim 1 wherein the mold is held at a temperature between 80° and 110° C.

4. The process of claim 1 wherein the composite interpolymer has only two phases, the first phase comprising about 60 to 95 wt % of said interpolymer and being polymerized from 95 to 99.8 wt % of n-butyl acrylate, 0.1 to 2.5 wt % of butylene diacrylate as a cross-linking agent and 0.1 to 2.5 wt % of allyl methacrylate or diallyl maleate as a graftlinking agent and said final phase is polymerized from 60 to 100% by weight of methyl methacrylate.

5. A composition particularly suitable for injection molding into molds held at temperatures less than 120° C. comprising
   (a) 35 to 75 wt % of a polyethylene terephthalate having an intrinsic viscosity of at least 0.3 dl/g measured as a 0.5% by weight solution in a 1:1 mixture of phenol and tetrachloroethane at 25° C.;
   (b) 5 to 20 wt % of a multiphase composite interpolymer comprising:
   (A) about 25 to 95 weight percent of a first elastomeric phase polymerized from a monomer system comprising about 75 to 99.8% by weight $C_1$ to $C_6$ alkyl acrylate, 0.1 to 5% by weight crosslinking monomer, 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and (B) about 75 to 5 weight percent of a final, rigid thermoplastic phase which is polymerized in the presence of said elastomeric phase and which is free of epoxy groups; and
(c) 20 to 45 wt % of glass fibers.
6. The process of claim 1, 2 or 3, wherein the composition comprises:

(a) 70 to 98 wt % of the polyethylene terephthalate, and
(b) 2 to 30 wt % of the composite interpolymer, said weight percentages being based on the combined weight of polyethylene terephthalate and interpolymer.

* * * * *